Aug. 12, 1969   J. F. CHARLES   3,460,428
THREADED FASTENER WITH TORQUE LIMITING DRIVE PORTIONS
Filed March 7, 1968

*INVENTOR.*
JAMES F. CHARLES
BY
Watts, Hoffmann, Fisher & Heinke
ATTORNEYS.

United States Patent Office 3,460,428
Patented Aug. 12, 1969

3,460,428
THREADED FASTENER WITH TORQUE
LIMITING DRIVE PORTIONS
James F. Charles, La Palma, Calif., assignor to The National Screw & Manufacturing Company, Cleveland, Ohio, a corporation of Ohio
Filed Mar. 7, 1968, Ser. No. 711,435
Int. Cl. F16b *31/00, 33/04*
U.S. Cl. 85—61                                                4 Claims

ABSTRACT OF THE DISCLOSURE

An internally threaded fastener including a cylindrical portion having an integral flange portion at one end thereof with a plurality of tool-engageable projections of predetermined strength extending from the flange portion in spaced relationship with the cylindrical portion, for transmitting limited rotational driving or setting force to the fastener.

---

The present invention relates to threaded fasteners having drive means which limits the driving torque that can be applied to the fastener.

One of the principal objects of the invention is the provision of a novel and improved threaded fastener that limits to a predetermined extent a tension load that can be applied to a threaded shank through relative rotation between the fastener and a mating part in threaded engagement therewith.

Another object of the invention is the provision of a novel and improved fastener of the character referred to in which tool-engageable projections extend from a body portion at locations radially outward from the central axis of the fastener and are of predetermined strength so as to shear from the body portion of the fastener when subjected to a predetermined shearing stress.

Another object of the invention is the provision of a novel and improved fastener of the character referred to in which the diameter or thickness of the projections can be varied in manufacture to control the maximum torque load that can be applied to the fastener through the projections.

Another object of the invention is the provision of a novel and improved fastener of the character referred to in which the projections that transmit limited rotational or counter-rotational force to the fastener are in exposed positions for ease of inspection.

Another object of this invention is the provision of a novel and improved fastener of the character referred to in which the tool-engageable exposed projections are of uniform strength, composition and cross-sectional area throughout their length so that torque control is not dependent upon a critical axial location of the shear plane and the strength of the projections can be readily and accurately determined by dimensional, non-destructive measurement at any place along the axial length.

Another object of this invention is the provision of a novel and improved fastener of the character referred to having a threaded aperture for receiving an externally threaded member and for applying thereto a predetermined tension load, and in which the tool-engageable surfaces of the driving projections extend axially of the threaded aperture.

Another object of this invention is the provision of a novel and improved fastener of the character referred to in which the projections that transmit rotational or counter-rotational force to the fastener constitute the only intended tool-engageable driving surface so that the fastener is essentially tamper-proof after the projections are sheared off.

Another object of the invention is the provision of a novel and improved fastener of the character referred to which is self-locking with respect to a mating member.

A further object of the invention is the provision of a novel and improved fastener of the character referred to having a cylindrical portion with a central, axially extending, internally threaded passageway with a flange at one end, and with two tool-engageable projections extending axially from the flange alongside the cylindrical portion, diametrically opposite each other.

The invention resides in certain constructions and arrangements of parts referred to in connection with the following description of the preferred embodiments described with reference to the accompanying drawings forming a part of this specification in which similar reference characters designate corresponding parts, and in which.

Figure 1:
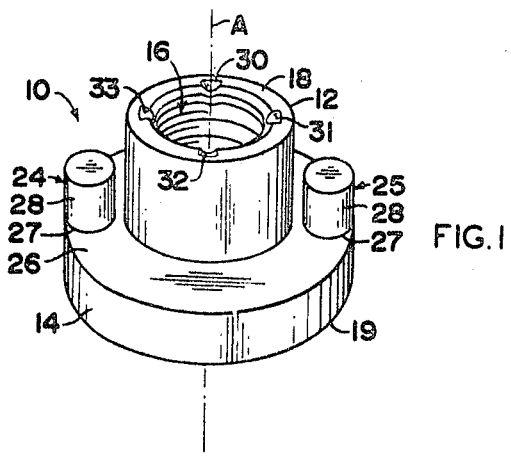
FIGURE 1 is a perspective view of a cylindrical flanged nut embodying the present invention.
Figure 2:
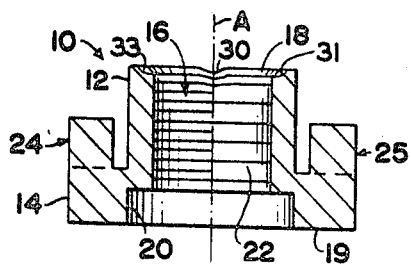
FIGURE 2 is a longitudinal sectional view of the nut of FIGURE 1.
Figure 3:
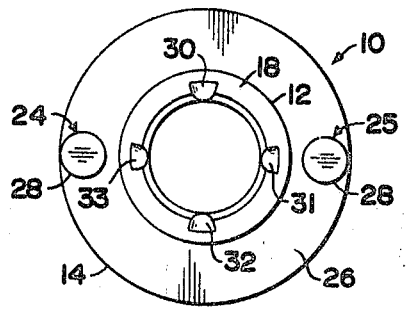
FIGURE 3 is a plan view of the nut of FIGURE 1.

Referring to the drawings, FIGURES 1 to 3 show a threaded fastener, specifically a nut 10, constructed to limit the driving torque that can be applied thereto during assembly with a mating threaded part. The body of the nut 10 includes a cylindrical portion 12 and a circular base flange 14 integral with the cylindrical portion and perpendicular to the central longitudinal axis thereof, indicated at A in the drawings. A central threaded bore 16 extends axially from end to end through the cylindrical portion 12 and flange 14; that is, from a top face 18 as viewed in the drawing to a bottom or bearing face 19 that is perpendicular to the axis A and indicated to bear against a member secured by the nut. The central bore 16 has a counterbore 20 or a countersink in the bearing face 19 for receiving an unthreaded portion of a bolt that may protrude beyond the thickness of a part being clamped by the nut. The internal thread of the nut is designated by the reference character 22 and is a continuous thread, typically of a standard design such as a Unified National Fine Thread Series (UNF) thread, with a class 3B allowance and tolerance, as defined in Screw-Thread Standards for Federal Services, 1957, Handbook H28, National Bureau of Standards.

The nut 10 has two identical tool-engageable projections 24, 25 for transmitting rotational driving or setting force to the flange 14 and cylindrical portion 12, and which shear from the nut under predetermined shear stress so as to accurately limit the torque that can be applied to the nut through the projections. In addition, the projections are located where they are accessible for visual inspection and dimension, non-destructive, measurement. The projections 24, 25 as shown are cylindrical and each extends in a direction axially of the bore 16 from and perpendicular to an upper surface 26 of the flange 14 at a location opposite the other, diametrically of the cylindrical portion 12. Both projections are located radially within the periphery of the flange 14 and therefore require no additional surrounding clearance in use over that required for the flange. As shown, the projections are spaced radially from the cylindrical portion 12 and extend from the surface 26 a distance sufficient to be adequately engaged by a driving tool used to install the nut. Where desired, more than two tool-engageable projections can be provided, as for increased torque, and are preferably equally spaced about the nut.

The preferred construction of the projections 24, 25 embodies a number of advantages features, including uniform strength along the entire length, uniform cross sectional area, right-angle projection from the adjoining body surface, and axially extending tool-engageable abutment surfaces. Typically, the projections are engaged by a driving tool along their entire axial length so that it is the material at the juncture 27 of each projection and the upper surface 26 of the flange 14 that is subjected to shearing stress and that is determinative of the effective strength of the projection. However, by virtue of the uniform strength of the projections, it is not critical that the plane of shear occur exactly at the juncture 27 for accurate torque control and an incompletely seated tool can nevertheless apply the proper torque load. Uniform strength throughout each projection is obtained by constructing the projections of uniform composition and uniform cross sectional area.

Uniform cross sectional area provides the additional benefit of permitting a dimensional measurement of the thickness of a projection at any axial location. Such a measurement is identical to the corresponding dimension at the juncture 27 when the projection extends at right angles to the adjoining body surface, and at any other angular extent of the projection the measurement bears a definite relationship to the area at the juncture. From such a measurement, which need not be critically taken at the juncture 27, the shear strength at the juncture 27 and hence the maximum torque that the projections will transmit can be determined non-destructively prior to use.

By virtue of the axial extent of the projects 24, 25, they readily receive and accurately locate a driving tool placed over the top face 18 and cylindrical portion 12 of the nut to apply the nut to a threaded bolt or pin, and they also provide tool-engageable abutment surfaces 28 that extend axially, perpendicular to the direction in which the rotational driving force of the tool is applied. As a result, torque from the driving tool is efficiently transmitted to the nut 10 without creating axial components of force, which might tend to separate or unseat the driving tool from the nut or which might affect the shear strength of the projections.

It will be readily apparent that by limiting the torque that can be applied to the nut 10, the tension load on a threaded shank of a bolt to which the nut is applied is similarly limited. With the above construction, a particular tension load to be applied to the bolt in accordance with specific requirements of the intended use is attained by providing a particular diameter or cross section of the projections 24, 25 that will permit the projections to shear from the nut at a driving torque just sufficient to produce the required tension load. The actual cross sectional area of the projections required to provide any given tension load will, of course, vary with the particular material from which the nut is made.

The nut 10 incorporates a self-locking feature that holds the nut firmly in clamping relation when threadedly engaged with a bolt. To this end, the thread 22 has four displaced and/or deformed areas 30, 31, 32, 33 formed therein and in the top face 18 of the nut at the upper end of the threaded bore 16. The displaced areas are circumferentially spaced equally with respect to one another, extend essentially radially and axially with respect to the nut and deform and alter the helix angle of the thread 22 where they occur. The areas are arcuately shaped in transverse cross section, blend into the nondeformed adjacent thread portions and are inclined inward and toward the opppsite or bearing face of the nut. The areas 30 to 33 can be formed by forcing or pressing a tool with projections corresponding to the shape of the areas against the upper end 18 of the nut and into a bore 16 a predetermined amount. The metal of the threads is not cut or removed but is displaced and the threads are accordingly deformed to produce areas having helix angles different from that of the normal thread and which effect thread interference when the nut is applied to a bolt.

Figure 4:
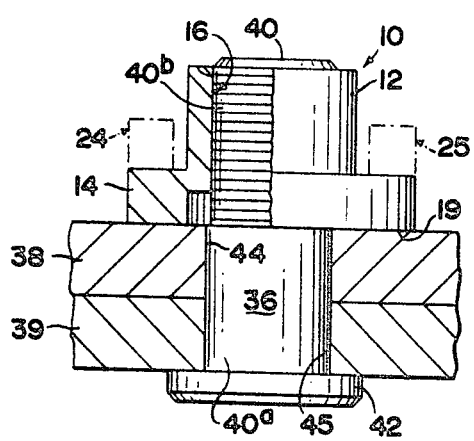
FIGURE 4 is a diagrammatic view partly in side elevation and partly in section showing the nut of FIGURE 1 in threaded engagement with a bolt and clamping two members therebetween.

In FIGURE 4 of the drawings the nut 10 is shown in threaded engagement with a bolt or pin 36, clamping two members 38, 39 together under a predetermined compressive load. The bolt 36 is comprised of a shank 40 and a head 42. An unthreaded portion 40a of the shank extends through aligned apertures 44, 45 in the two clamped members 38, 39, respectively. A threaded portion 40b of the shank extends beyond the member 38 and is in threaded engagement with the threaded bore 16 of the nut. The bearing face 19 of the flange 14 bears against the member 38 and the head 42 of the bolt or pin bears against the member 39.

The nut 10 is assembled on the bolt or pin 36 by torque applied as a couple about the axis A' of the nut by a hand tool or power driven tool engaged with the projections 24, 25. The projections are indicated in phantom in FIGURE 4 zecause they have been sheared from the flange 14 to terminate the assembling of the nut and bolt. Because the projections shear from the flange under predetermined shear stress, the nut 10 is capable of applying only a predetermined limited tension load to the shank 40. Once the projections shear from the nut no additional tension can be applied to the shank. This limits the clamping force that can be applied by the assembled nut and bolt to the members 38, 39. The threaded portion 40b of the shank extends the length of the threaded bore 16 so that the deformed areas 30 to 33 of the thread 22 engage with the threaded portion 40b of the bolt and create an interference fit that locks the nut 10 and bolt 36 together.

As will be apparent from FIGURE 4, the assembled nut 10, by virtue of its circular periphery, no longer has a surface intended for or readily facilitating tool engagement. This makes it difficult to remove the nut and the assembly is therefore tamper-resistant. In addition, the absence of the projections 24, 25 on the nut of the assembly is a visual indication that the nut has been applied with sufficient torque to stress the shank 40 the desired predetermined amount.

Figure 5:
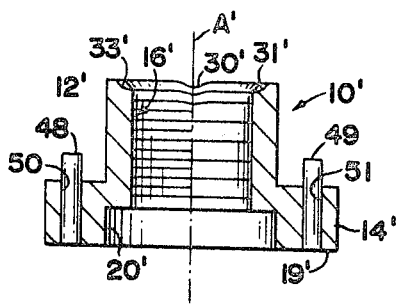
FIGURE 5 is a longitudinal sectional view similar to FIGURE 2 illustrating a second embodiment of the invention.

A second embodiment of the nut embodying the present invention is shown at 10' in FIGURE 5. Except for the construction of projections for applying limited torque to the nut, the nut 10' is in all respects identical in construction to the nut 10. Thus, the nut 10' includes a cylindrical portion 12', an integral circular base flange 14', a central threaded bore 16', a counterbore 20' and four circumferentially spaced deformed areas, three of which are shown at 30', 31', 33', which provide a locking action with the threads of the bolt to be received in the bore 16'.

Two cylindrical pins 48, 49 are located in cylindrical bores 50, 51, respectively, of the flange 14'. The cylindrical bores extend parallel to the axis A' of the threaded bore and are located on diametrically opposite sides of the cylindrical portion 12'. The pins 48, 49 are tightly engaged by a friction fit with the bores 50, 51, are flush with the lower or bearing surface 19' and extend upwardly in the orientation of FIGURE 5 from the flange 14' to provide tool-engageable projections similar in shape and orientation to the projections 24, 25, but typically somewhat smaller in diameter or cross sectional area. The maximum diameter or dimension of the pins 48, 49 radially of the nut 10' is more limited than that of the projections 24, 25 because the pin receiving bores 50, 51 must be spaced inwardly from the peripheral edge of the flange 14'. However, because the pins are separate members they can be made of different material from the nut and achieve the same or greater strength as that obtained with larger diameter integral projections. Thus, the separate pins permit a greater range of shear strengths, than do integral projections, through the use of different materials as well as by varying the cross sectional area.

In use, the portion of each pin 48, 49 extending from the flange 14' is engaged by a rotatable driving tool and transmits torque to the flange 14' and cylindrical portion 12'. At a predetermined torque the extending portion of each pin shears from the portion received in the respective bore 50, 51. As described in connection with the embodiment of FIGURES 1 to 4, this limits the axial tension applied to a bolt or pin in threaded engagement therewith.

From the foregoing description of the preferred embodiments of the invention, it will be apparent that the objects heretofore enumerated and others have been accomplished and that there has been provided a threaded fastener with exposed, tool-engageable, projections that limit the tension load that can be applied to a threaded shank, that can be readily measured to determine their strength, that can be varied in cross sectional area to vary their strength and that provide other advantages as described.

While the preferred embodiments of the invention have been described in considerable detail, the invention is not limited to the particular construction referred to and it is the intention to hereby cover all adaptations, modifications and practices thereof.

What is claimed is:

1. A threaded fastener having a cylindrical portion with a central, axially extending, internally threaded, passageway; an enlarged flange portion at one end of the cylindrical portion integral therewith and providing a bearing face; a plurality of spaced axially elongated projections extending from and perpendicular to a non-bearing side of the flange portion axially of the passageway alongside and spaced radially outwardly from the cylindrical portion at locations opposite each other diametrically of the cylindrical portion for transmitting limited rotational driving or setting force to the flange and cylindrical portions about the axis of the internally threaded surface, said projections being of essentially uniform cross-section and composition along their axial length and of predetermined strength to shear from the body portion when subjected to a predetermined shearing stress; and means integral with the body portion to inhibit relative rotation between the fastener and a threaded shank with which it is engaged.

2. A threaded fastener having a body portion with an external surface of revolution; a threaded aperture in the body portion, co-axial with said external surface; an integral flange portion at one end of said body portion, extending radially outward beyond said external surface of revolution; and a plurality of spaced tool-engageable projections extending from the flange in radially outwardly spaced relationship to said surface of revolution, constructed to shear under predetermined shear stress so as to transmit limited rotational driving or setting force.

3. A threaded fastener having a body portion with an external surface of revolution; a continuous uninterrupted threaded aperture through the body portion, co-axial with said external surface; an integral flange portion at one end of said body portion, extending radially outward beyond said external surface of revolution; and a plurality of spaced tool-engageable projections extending axially from the flange in radially outwardly spaced relationship to said surface of revolution for transmitting limited rotational driving force to the body portion, said projections being of essentially uniform cross section and composition so as to shear from the flange when subjected to a predetermined shearing stress.

4. A threaded fastener having a body portion with an external surface of revolution, an end adapted to bear against a clamped surface, and an opposite end spaced therefrom in part by said surface of revolution; a continuous uninterrupted threaded aperture through the body portion and co-axial with said external surface, the thread of said aperture being distorted adjacent said opposite end of the body portion to inhibit relative rotation between the fastener and a threaded shank with which it is engaged; an integral flange portion at the bearing end of said body portion, extending radially outward beyond said external surface of revolution and providing a bearing face for the fastener; a counterbore in the bearing face of the fastener; and a plurality of spaced tool-engageable projections extending axially from the flange in radially outwardly spaced relationship to said surface of revolution, constructed to shear under predetermined shear stress so as to transmit limited rotational driving or setting force.

References Cited

UNITED STATES PATENTS

| | | | |
|---|---|---|---|
| 1,261,916 | 4/1918 | Forbes | 85—45 |
| 1,966,414 | 7/1934 | Main | 85—61 |
| 2,519,417 | 8/1950 | Tripp. | |
| 3,285,119 | 11/1966 | Dean et al. | 85—61 |

RAMON S. BRITTS, Primary Examiner

U.S. Cl. X.R.

85—45; 151—21